2,965,646
PYRIDYLMETHYLDIBENZYLAMINES

Thomas Samuel Gardner, Rutherford, John Lee, Essex Fells, and Edward Wenis, Leonia, N.J., assignors to Hoffmann-La Roche Inc., Nutley, N.J., a corporation of New Jersey No Drawing. Filed Dec. 3, 1958, Ser. No. 777,855

4 Claims. (Cl. 260—296)

This invention relates to monopyridylmethyldibenzylamines and to acid addition salts hereof. The monopyridylmethyldibenzylamines of this invention may be represented by the following structural formula:

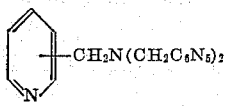

The compounds represented by the above formula may be synthesized by reacting a pyridine carboxylic acid such as picolinic acid, nicotinic acid or isonicotinic acid with thionylchloride. The pyridine carbonyl chloride formed in this manner is converted to the acid amide by reaction with dibenzylamine and the amide is reduced, e.g. with lithium aluminum hydride, to the monopyridylmethyldibenzylamine.

Alternatively, a pyridylmethylbenzylamine, such as 2-pyridylmethylbenzylamine, may be acylated with benzoyl chloride and the N-benzyl-N-(pyridylmethyl)benzamide thus produced is reduced as described above.

The compounds of the above formula form acid addition salts by reaction with inorganic or organic acids. The acid addition salts, which include salts such as the mineral acid salts, e.g. hydrochloride, hydrobromide, hydroiodide, phosphate, sulfate, nitrate, etc., arylsulfonic acid salts, e.g. benzenesulfonate, toluenesulfonate, etc., and other salts of organic acids, e.g. citrate, tartrate, ascorbate, salicylate, acetate, benzoate, etc., are also within the scope of the invention. Such salts may be produced by reacting the monopyridylmethyldibenzylamine with about one to two molar proportions of the inorganic or organic acid.

The compounds of this invention are useful for the treatment of gastrointestinal ulcers. They may be administered orally or parenterally by incorporating the base or a medicinally acceptable acid addition salt thereof in tablets, capsules, syrups, injectables or the like along with carriers, excipients, sterile liquid media, etc., according to conventional practice.

The examples which follow are illustrative of the invention. Certain intermediates obtained in the preparation of the products of this invention, as shown in the following examples, are novel compounds and they too are within the scope of the invention. All temperatures in the examples are stated in degrees centigrade.

Example 1

100 g. of 2-pyridylcarboxaldehyde and 100 g. of benzylamine were dissolved in 1000 ml. of ethanol and reduced with hydrogen gas at 1000 p.s.i. using 15 g. of 10% palladium on charcoal as catalyst. On completion of the hydrogenation, the catalyst was removed by filtration and the excess alcohol removed in vacuo. The residual oil was distilled under vacuum. The 2-pyridylmethylbenzylamine distilled at 150–155° at 3–4 mm.

136 g. of 2-pyridylmethylbenzylamine and 110 g. benzoyl chloride were reacted together in 750 ml. of pyridine on a water bath for 4 hours. The pyridine was removed in vacuo and the residue was treated with water and saturated with sodium bicarbonate. The N-benzyl-N-(2-pyridylmethyl)benzamide thus formed was extracted with ether. The ether extract was concentrated, leaving a solid residue. The residual N-benzyl-N-(2-pyridylmethyl)benzamide was recrystallized from ethyl acetate, M.P. 95–96°.

87 g. of N-benzyl-N-(2-pyridylmethyl)benzamide, in the form of a fine powder, were dropped into a solution of 37.5 g. of lithium aluminum hydride in 2.3 kg. of dry ether. The solution was stirred for 14 hours. The excess lithium aluminum hydride was decomposed with 250 ml. of ethyl acetate and the mixture was stirred for 2 hours. Then 150 ml. of water were added and stirring was continued for one hour. The mixture was then filtered and the insoluble filter cake was extracted with 2 liters of hot benzene. The ether and benzene solutions were combined and evaporated under vacuum. The residual oil was distilled at 220–225°/3–5 mm. The forerun (under 220°) and the fraction boiling at 225–230° were discarded. The product, N-(2-pyridylmethyl)dibenzylamine, was crystallized from ethyl acetate, M.P. 47–48°.

Example 2

350 g. of nicotinic acid were converted to the acid chloride by reaction with 1500 g. of thionyl chloride by heating at reflux for 14 hours. The excess thionyl chloride was distilled off using a Vigreaux column and water bath at 80°. The nicotinyl chloride hydrochloride was dissolved in pyridine. The solution was treated with 375 g. of dibenzylamine. The pyridine solution which became warm was then heated for 2 hours at 100°. Most of the pyridine was removed by distillation and the residue containing the desired product was poured onto ice. The ice cold solution was made alkaline with concentrated ammonia. Most of the product, N,N-dibenzylnicotinamide, precipitated and was removed by filtration. The alkaline solution was extracted with ether to obtain an additional yield of the product. The N,N-dibenzylnicotinamide was crystallized twice from ether, M.P. 83–84°.

10 g. of N,N-dibenzylnicotinamide was dissolved in 100 ml. of ethanol. 10 ml. of 10N hydrogen chloride in ethanol were added. The solution was cooled, whereupon N,N-dibenzylnicotinamide hydrochloride precipitated as colorless crystals, M.P. 175–176°.

209 g. of N,N-dibenzylnicotinamide were added to a solution of 90 g. of lithium aluminum hydride in 2.3 kg. of dry ether over a period of one-half hour. The reaction solution was stirred for 14 hours, and the excess lithium aluminum hydride was destroyed with 550 ml. of ethyl acetate and the reduction complex was destroyed by the addition of 150 ml. ice water. The ether was separated from the insoluble material and the filter cake was extracted with hot ethyl acetate. The ether and the ethyl acetate extracts were combined and concentrated leaving a residual oil which was distilled at 1–2 mm. pressure with a Vigreaux column at 200–220°. The fractions boiling below 200° and above 220° were discarded. The desired product distilling at 200–220° was dissolved in 90 ml. of hot ethyl acetate, then chilled to −10°. The product, N-(3-pyridylmethyl)dibenzylamine, crystallized. The crystals were washed with ice cold petroleum ether (boiling range 60–70°) and dried over phosphorus pentoxide in vacuo, M.P. 62–63°.

5 g. of N-(3-pyridylmethyl)dibenzylamine were dissolved in 50 ml. of 10 N HCl-ethanol and concentrated to an amorphous solid under vacuum. The amorphous solid, N-(3-pyridylmethyl)dibenzylamine dihydrochloride, was dissolved in 50 ml. of ethanol to which was added an additional 5 g. of the free base, N-(3-pyridylmethyl)dibenzylamine. On cooling, the crystalline monohydrochloride separated which was recrystallized from ethanol, M.P. 209–210°.

The tartrate, citrate, sulfate, nitrate and phosphate salts of N-(3-pyridylmethyl)dibenzylamine were also prepared by proceeding in the following manner: 0.5 g. of N-(3-pyridylmethyl)dibenzylamine were dissolved in 15 ml. of ethanol. To this solution was added the acid corresponding to the salt desired. Ether was then added. The mixture was then evaporated to remove the solvents. In each instance a gummy residue comprising the salt of N-(3-pyridylmethyl)dibenzylamine corresponding to the acid used was obtained. The salts were all soluble in water.

Example 3

34 g. of isonicotinic acid were converted to the acid chloride by heating with thionyl chloride for 14 hours. The isonicotinyl chloride hydrochloride was then reacted with 25 g. of dibenzylamine in pyridine, at reflux for 2 hours. The solution was then concentrated to a small volume. 250 ml. of water and 50 g. of sodium bicarbonate were added. The solution was then extracted with ether. The ether solution was decolorized with activated carbon and concentrated. Crystals of N,N-dibenzylisonicotinamide precipitated, M.P. 85–86°.

8 g. of N,N-dibenzylisonicotinamide in 100 ml. of ethanol were treated with 10 ml. of 10 N hydrogen chloride in ethanol solution. N,N-dibenzylisonicotinamide hydrochloride precipitated, M.P. 185–187°.

A solution of 28.5 g. of N,N-dibenzylisonicotinamide in 150 ml. of ether was dropped into a solution of 11.4 g. of lithium aluminum hydride in 500 ml. of ether. The reaction mixture was refluxed for 4 hours, then 100 ml. of ethyl acetate were added. After 14 hours standing, 50 ml. of ice water were added to the mixture and filtered. The ether layer was concentrated under vacuum to an oil. The product, N-(4-pyridylmethyl)dibenzylamine, was obtained in crystalline form by dissolving the oil in Skellysolve B (boiling range 60–70°). The crystalline N-(4-pyridylmethyl)dibenzylamine melted at 82–83°.

Example 4

212 g. of benzaldehyde and 216 g. of 3-pyridylmethylamine in 800 ml. of ethanol were reduced under a pressure of 500 p.s.i. of hydrogen at 60° in the presence of 20 g. of 10% palladium-on-carbon catalyst. The catalyst was removed by filtration and the ethanol was removed by distilling the filtrate under vacuum. The 3-pyridylmethylbenzylamine distilled at 178–180° at 2 mm.

100 g. of 3-pyridylmethylbenzylamine were dissolved in 500 ml. of pyridine, and 105 g. of benzoyl chloride were added over a period of ½ hour. The solution was heated at reflux for 4 hours, cooled and 100 ml. of water were added. The solution was then concentrated to a solid. The solid was dispersed in 1.5 liters of ice water, made alkaline with 200 ml. of concentrated ammonium hydroxide and extracted 5 times with 250 ml. portions of ether. The ether extracts were combined and washed with 250 ml. of ice water, then concentrated to 200 ml. The N-benzyl-N-(3-pyridylmethyl)benzamide crystallized from ether, M.P. 75–76°.

30 g. of lithium aluminum hydride were dissolved in 2.5 lbs. of dry ether and the solution was cooled in an ice bath. To this solution were added 70 g. of N-benzyl-N-(3-pyridylmethyl)benzamide in small portions over a period of ½ hour. After stirring for 2 hours, the mixture was permitted to stand overnight and the excess lithium aluminum hydride was then decomposed by the addition of 200 ml. of ethyl acetate. The reduction complex was destroyed by the addition of 100 ml. of ice water. The ether was separated from the insoluble material and the filter cake was extracted once with 200 ml. of hot benzene. The combined benzene-ethyl acetate-ether solution was concentrated to an oil by distillation under vacuum and the oil was then distilled at 2 mm. with a Vigreaux column. The fraction boiling at 200–212° was collected and dissolved in 45 ml. of ethyl acetate. The ethyl acetate solution was chilled in a carbon dioxide-acetone bath and the product crystallized. Rapid filtration and washing with ice cold Skellysolve B (boiling range 60–70°) gave pure, crystalline N-(3-pyridylmethyl)dibenzylamine, M.P. 60–61°.

We claim:
1. N-(2-pyridylmethyl)dibenzylamine.
2. N-(3-pyridylmethyl)dibenzylamine.
3. N-(4-pyridylmethyl)dibenzylamine.
4. A compound selected from the group consisting of bases represented by the structural formula

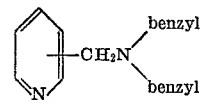

and medicinally acceptable acid addition salts thereof.

References Cited in the file of this patent

Graf et al.: Chem. Abstracts, vol. 30, p. 7576 (1936).
Hukusima: Chem. Abstracts, vol. 36, col. 7239 (1942).
Fromherz et al.: Chem. Abstracts, vol. 42, col. 8957 (1948).
Rice et al.: J. Am. Chem. Soc., vol. 77, pp. 5434–5436 (1956).

UNITED STATES PATENT OFFICE
CERTIFICATION OF CORRECTION

Patent No. 2,965,646                           December 20, 1960

Thomas Samuel Gardner et al.

It is hereby certified that error appears in the above numbered patent requiring correction and that the said Letters Patent should read as corrected below.

Column 1, lines 18 to 23, the formula should appear as shown below instead of as in the patent:

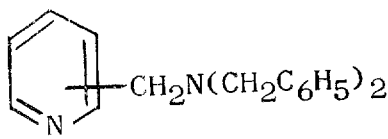

Signed and sealed this 23rd day of May 1961.

(SEAL)
Attest:

ERNEST W. SWIDER
Attesting Officer

DAVID L. LADD
Commissioner of Patents